United States Patent
Gong et al.

(10) Patent No.: US 9,641,020 B2
(45) Date of Patent: May 2, 2017

(54) RECEIVER

(71) Applicant: South University of Science and Technology of China, Shenzhen (CN)

(72) Inventors: Yi Gong, Shenzhen (CN); Zhi Quan, Shenzhen (CN); Chong Qin, Shenzhen (CN); Zidong Han, Shenzhen (CN)

(73) Assignee: South University of Science and Technology of China, Shenzhen (CN)

( * ) Notice: Subject to any disclaimer, the term of this patent is extended or adjusted under 35 U.S.C. 154(b) by 0 days.

(21) Appl. No.: 15/169,322

(22) Filed: May 31, 2016

(65) Prior Publication Data

US 2016/0285489 A1 Sep. 29, 2016

Related U.S. Application Data

(63) Continuation of application No. PCT/CN2015/075354, filed on Mar. 30, 2015.

(51) Int. Cl.
*H04B 5/00* (2006.01)
*H02J 7/02* (2016.01)
(Continued)

(52) U.S. Cl.
CPC ............ *H02J 7/025* (2013.01); *H02J 50/20* (2016.02); *H02J 50/80* (2016.02)

(58) Field of Classification Search
CPC .......... H04B 1/16; H04B 1/40; H04B 1/0039; H04B 1/71637; H04B 5/00; H04B 7/00; H04B 7/0805; H04B 7/26
(Continued)

(56) References Cited

U.S. PATENT DOCUMENTS 5,999,578 A * 12/1999 Ha .................. H03G 3/3078
  375/345
7,634,226 B2 * 12/2009 Estevez .............. G06K 17/00
  455/41.1
(Continued)

FOREIGN PATENT DOCUMENTS

CN 103346834 A 10/2013
CN 103716082 A 4/2014
(Continued)

OTHER PUBLICATIONS

International Search Report issued for corresponding International Patent Application No. PCT/CN2015/075354 mailed on Dec. 31, 2015.

*Primary Examiner* — Quochien B Vuong
(74) *Attorney, Agent, or Firm* — Myers Wolin, LLC

(57) ABSTRACT

A receiver is provided, wherein the receiver includes an antenna, a band pass filter and a frequency mixer electrically connected in sequence, and a local oscillator electrically connected with the frequency mixer, and further includes: a diplexer for separating and outputting high and low frequency components in a signal outputted by the frequency mixer; and a rectifying unit for converting the high frequency component outputted by the diplexer into direct current energy and storing the direct current energy in a storage battery. The diplexer introduced in the receiver separates a baseband signal and a carrier signal in the same path losslessly, respectively conducts information decoding and energy capture, implements simultaneous information and energy transfer, and does not need to change the present modulation technology, therefor having strong compatibility, being reasonable and simple in structure, and being easy to implement.

2 Claims, 1 Drawing Sheet

(51) Int. Cl.
*H02J 50/20* (2016.01)
*H02J 50/80* (2016.01)

(58) Field of Classification Search
USPC ..... 455/41.1, 41.2, 41.3, 572, 573; 307/104; 375/316
See application file for complete search history.

(56) References Cited

U.S. PATENT DOCUMENTS

| | | | | |
|---|---|---|---|---|
| 8,315,586 | B2* | 11/2012 | Aoki | H04L 27/22 375/280 |
| 8,508,194 | B2* | 8/2013 | Kim | H03K 17/6871 323/222 |
| 2001/0050951 | A1* | 12/2001 | Dellon | H04B 1/40 375/219 |
| 2014/0306545 | A1* | 10/2014 | Robertson | H02J 5/005 307/104 |
| 2014/0306547 | A1* | 10/2014 | Yanagawa | H02J 5/005 307/104 |

FOREIGN PATENT DOCUMENTS

| | | |
|---|---|---|
| CN | 104135770 A | 11/2014 |
| JP | 2004289713 A | 10/2004 |

* cited by examiner

RECEIVER

CROSS-REFERENCE TO RELATED APPLICATIONS

This application is a continuation of International Application PCT/CN2015/075354, filed on Mar. 30, 2015, which claims priority to Chinese Application No. 201520172426.5, filed Mar. 25, 2015, the contents of each of which are hereby incorporated by reference.

FIELD OF THE INVENTION

The present invention relates to the field of wireless communication technologies, and more particularly to a receiver.

BACKGROUND

Simultaneous Wireless Information and Energy Transfer is an emerging communication technology that integrates wireless communication technology and wireless energy transfer technology to implement simultaneous information and energy transfer through a wireless manner. With the development of technology, it becomes a trend to integrate energy technology with communication technology, while the intersection of the two fields is urgently needed by the social development to become an important part for implementing "green communications", which not only can implement high speed reliable communications, but also can effectively ease the scarcity pressure of energy and frequency spectrum, and has significant application values in such aspects as industry, medical treatment, infrastructure developing, or the like. Wireless energy transfer is a technology that has an extremely wide application prospect, and is expected to be applied to Internet of Things and various wireless terminals or devices that depend on a battery with limited capacity to provide electric energy, feeds power to the battery through collecting energy from signals, extremely extends the standby time, and breaks through the power supply limitation of a conventional battery. Compared with a traditional energy source (such as wind energy, solar energy, or the like), the energy obtained by wireless has very strong stability and sustainability, and the wireless itself can carry information. Simultaneous information and energy transfer is a novel communication technology based on wireless energy transfer, which can transmit information and energy to a device simultaneously, can effectively solve the standby time problem and the safety problem caused by line aging, and has attracted a wide spread attention recently. The present design solutions for a receiver performing simultaneous information and energy transfer like time switching (Time Switching, TS) and power (Power Spitting, PS) only distribute time and power for a signal beam, and have severe energy losses, which cannot achieve the real effects of simultaneous information and energy transfer.

SUMMARY

In order to solve the foregoing technical problem, a receiver is provided, and a technical solution is as follows:
a receiver comprising an antenna, a band pass filter and a frequency mixer electrically connected in sequence, and a local oscillator electrically connected with the frequency mixer, wherein the receiver further includes:

a diplexer for separating and outputting high and low frequency components in a signal outputted by the frequency mixer;

a rectifying unit for converting the high frequency component outputted by the diplexer into direct current energy and storing the direct current energy in a storage battery; and a first low pass filter for conducting low pass filtering the low frequency component outputted by the diplexer to obtain a baseband information signal.

Based on the foregoing technical solution, the receiver may further be improved as follows that:

preferably, the rectifying unit includes a diode and a second low pass filter electrically connected in sequence;

the diode rectifies the high frequency component outputted by the diplexer, and the second low pass filter filters higher harmonics in signals rectified by the diode to obtain direct current energy and output the direct current energy to a storage battery for storage.

Preferably, the receiver further includes a low noise amplifier, the input end of the low noise amplifier being connected with the output end of the band pass filter, and the output end of the low noise amplifier being connected with the input end of the frequency mixer.

Preferably, the receiver further includes an analogue-to-digital converter, the input end of the analogue-to-digital converter being connected with the output end of the first low pass filter.

The receiver has the advantageous effects that:
the diplexer, which is introduced in a receiver, separates a baseband signal and a carrier signal in the same path losslessly, respectively conducts information decoding and energy harvesting, implements simultaneous information and energy transfer, and does not need to change the present modulation technology, therefore having strong compatibility, being reasonable and simple in structure, and being easy to implement.

BRIEF DESCRIPTION OF THE DRAWINGS

The embodiments of the present invention will be further described in details hereinafter with reference to the drawings.

DETAILED DESCRIPTION OF THE PREFERRED EMBODIMENTS

The principles and features of the present invention will be described hereinafter with reference to the drawings, and the examples illustrated are only used to interpret the present invention, but are not intended to define the scope of the present invention.

Figure 1:
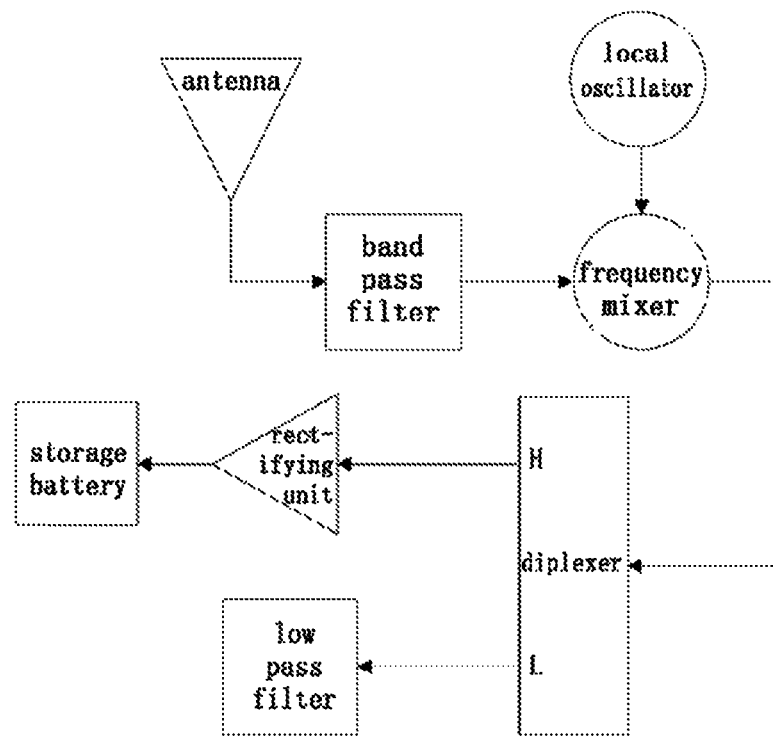
FIG. 1 is a structure diagram of a receiver.
Figure 2:
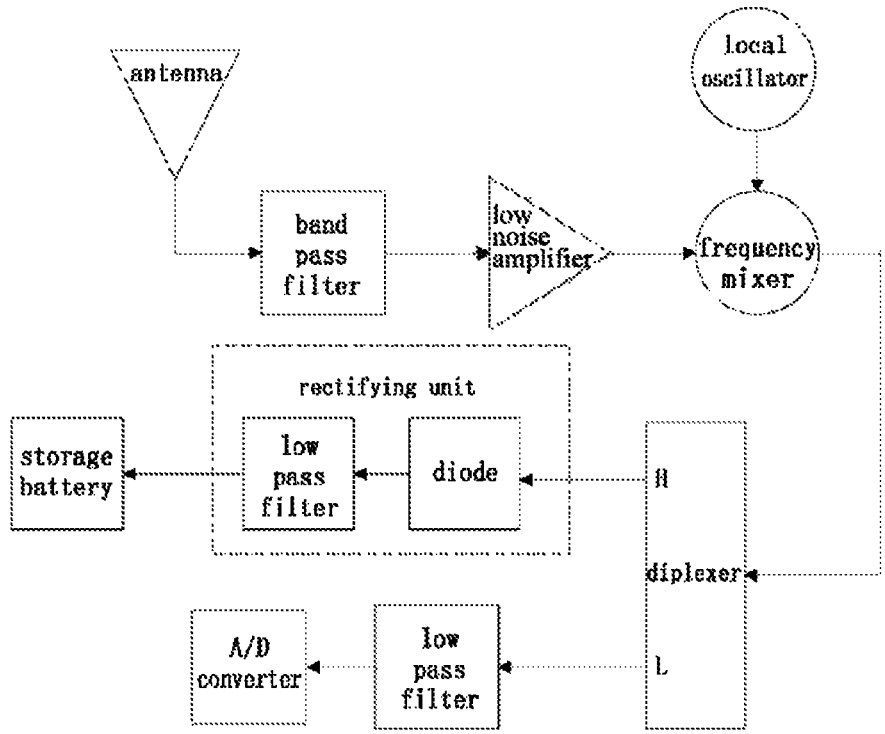
FIG. 2 is a structure diagram of the receiver.

FIG. 1 is a structure diagram of a receiver. As shown in FIG. 1, the receiver includes: an antenna, a band pass filter and a frequency mixer electrically connected in sequence, and a local oscillator electrically connected with the frequency mixer, wherein the receiver further includes:

a diplexer for separating and outputting high and low frequency components in a signal outputted by the frequency mixer; and a rectifying unit for converting the high frequency component outputted by the diplexer into direct current energy and storing the direct current energy in a storage battery;

FIG. 2 is a structure diagram of the receiver; as shown in FIG. 2, the rectifying unit in the embodiment includes a diode and a second low pass filter electrically connected in sequence, the diode being configured to rectify the high frequency component outputted by the diplexer, and the second low pass filter being configured to filter higher harmonics in signals rectified by the diode to obtain direct current energy and output the direct current energy to a storage battery for storage; and a first low pass filter for conducting low pass filtering the low frequency component outputted by the diplexer to obtain a baseband information signal.

As shown in FIG. 2, the receiver in the embodiment further includes: a low noise amplifier and an analogue-to-digital converter, the input end of the low noise amplifier being connected with the output end of the band pass filter, and the output end of the low noise amplifier being connected with the input end of the frequency mixer; and the input end of the analogue-to-digital converter being connected with the output end of the first low pass filter.

The working principle of the receiver will be further introduced hereinafter by taking the working process in an embodiment as example.

A radio-frequency signal received by the antenna of the receiver passes through the band pass filter, and enters the low noise amplifier thereafter, and the signal after coming out from the low noise amplifier is mixed with a specific frequency produced by the local oscillator in the frequency mixer; the signals in the same path including different frequencies after frequency mixing are transmitted to the diplexer, then the diplexer separates high frequency components and low frequency components in the signals; the high frequency components are converted into direct current energy by the rectifying unit, and the direct current energy is stored in a storage battery for energy capture; and the low frequency components pass through the low frequency filter to obtain a baseband signal to be processed finally, then the signal is connected with the analogue-to-digital converter at the rear end to obtain expected information through digital signal processing; in this way, simultaneous information demodulation and energy capture can be conducted on the signals in the same path to achieve the effect of simultaneous information and energy transfer.

In the embodiment, it is assumed that the modulation mode is AM (amplitude modulation), and the signal received by the antenna of the receiver is $S(t)+N(t)$, wherein $S(t)$ is a useful signal, and $S(t)=m(t)*\cos\omega_0 t$, wherein $m(t)$ is a baseband signal including information, $N(t)$ is an additive white Gaussian noise; and the signal passing through the low noise amplifier is $A*S(t)+K*N(t)$, wherein A and K are constants; because new noises will be introduced by the low noise amplifier, $K>A$.

The signal passing through the band pass filter is $A*S(t)+K*N_i(t)$, wherein $N_i(t)=Nc(t)\cos(\omega_0 t)-Ns(t)\sin(\omega_0 t)$.

$N_i(t)$ is a narrow band Gaussian noise; because it is obtained by the band pass filter through a stable white Gaussian noise and known through a random procedure, it can be represented by an in-phase component $N_C(t)$ and a quadrature component $N_S(t)$. The power relationship is represented as: $P(N_i(t))=P(N_S(t))=P(N_C(t))=N_0 B$, wherein B represents bandwidth, and $N_0$ is power spectrum density.

Frequency mixing is conducted in the frequency mixer:

$$A*S(t)*\cos(\omega_0 t)=A*m(t)*\cos^2(\omega_0 t)=0.5A*m(t)+0.5A*m(t)\cos(2\omega_0 t);$$

$$K*N_i(t)\cos(\omega_0 t)=0.5K*N_c(t)+0.5K*N_c(t)\cos(2\omega_0 t)-0.5K*N_s(t)\sin(2\omega_0 t).$$

Signals are divided into baseband signals (low frequency component) and frequency-doubled signals (high frequency component) according to the frequencies, and the low frequency components and the high frequency components are separated through the diplexer, wherein the low frequency components include: $0.5K*N_c(t)$ and $0.5A*m(t)$; and the high frequency components include: $0.5A*m(t)\cos(2\omega_0 t)$, and $$0.5K*N_c(t)\cos(2\omega_0 t)-0.5K*N_s(t)\sin(2\omega_0 t);$$

the high frequency components are converted into direct current through a rectifier, in order to charge the storage battery for obtaining energy, and the energy corresponding to the $0.5A*m(t)\cos(2\omega_0 t)$ signal in the high frequency component is: $EH1=0.25A^2*E\{(m(t)\cos(2\omega_0 t))^2\}=0.125A^2*E\{(m(t))^2\}=0.125A^2 P_m$. The energy corresponding to the $0.5K*N_c(t)\cos(2\omega_0 t)-0.5K*N_s(t)\sin(2\omega_0 t)$ signal in the high frequency component is:

$$\begin{aligned}EH2 &= E\{\{0.5K*[Nb(t)\cos(2\omega_0^t)-Ns(t)\sin(2\omega_0^t)]\}^2\}\\&= 0.125K^2*E\{Nb(t)^2\}+0.125K^2*E\{Ns(t)^2\}\\&= 0.125K^2 N_0 B+0.125K^2 N_0 B\\&= 0.25K^2 N_0 B.\end{aligned}$$

The total energy corresponding to the high frequency components is: $EH=EH_1+EH_2=0.125A^2 P_m+0.25K^2 N_0 B$; the components of doubling frequency and high frequency outputted from the diplexer are rectified by the diode, and converted into direct current energy stored in the storage battery for energy storage after the upper harmonics thereof are filtered by the second low pass filter, thus implementing energy harvesting.

The obtainable information rate is:

$$C = B\log_2^{\{1+E\{(Am(t))^2\}/N_0 B\}} = B\log_2^{\{1+A^2 P_m/N_0 B\}};$$

wherein the noises excluding the bandwidth of the low frequency component baseband signal outputted by the diplexer are filtered through the low frequency component, so that the signal-to-noise ratio is increased, and then the signal can be handled over to the rear end for processing to obtain information.

The receiver does not need to change the present modulation technology by simultaneously conducting information decoding and energy harvesting, which has strong compatibility, is reasonable and simple in structure, and is easy to implement. Moreover, the diplexer is substantially lossless, and can achieve the real effect of simultaneous information and energy transfer.

The above is specific explanations to the preferred embodiments of the invention, but the invention is not limited to the above embodiments. People skilled in the art may make various equivalent modifications or substitutions without departing from the spirit of the invention, and these equivalent modifications or substitutions shall all fall within the scope defined by the claims of the present application.

What is claimed is:
1. A receiver, comprising,
an antenna;
a band pass filter and a frequency mixer electrically connected in sequence;

a local oscillator electrically connected with the frequency mixer, a diplexer for separating and outputting high and low frequency components in a signal outputted by the frequency mixer;

a rectifying unit for converting the high frequency component outputted by the diplexer into direct current energy and storing the direct current energy in a storage battery;

a first low pass filter for conducting low pass filtering of the low frequency component outputted by the diplexer to obtain a baseband information signal having an increased signal-to-noise ratio;

an analog-to-digital converter, wherein the input end of the analog-to-digital converter is connected with the output end of the first low pass filter, and a low noise amplifier, wherein the input end of the low noise amplifier is connected with the output end of the band pass filter, and wherein the output end of the low noise amplifier is connected with the input end of the frequency mixer, wherein the signal is divided at the diplexer into a baseband signal for the low frequency component and a frequency-doubled signal for the high frequency component according to the frequencies.

2. The receiver of claim 1, wherein:

the rectifying unit comprises a diode and a second low pass filter electrically connected in sequence; the diode rectifies the high frequency component outputted by the diplexer; and the second low pass filter filters higher harmonics in signals rectified by the diode to obtain direct current energy and output the direct current energy to a storage battery for storage.

* * * * *